T. J. NASH.
AUTOMOBILE JACK.
APPLICATION FILED OCT. 28, 1916.
1,230,315.
Patented June 19, 1917.
2 SHEETS—SHEET 1.
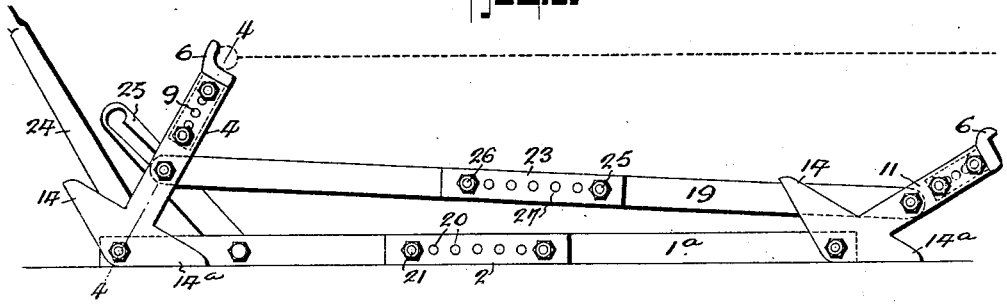
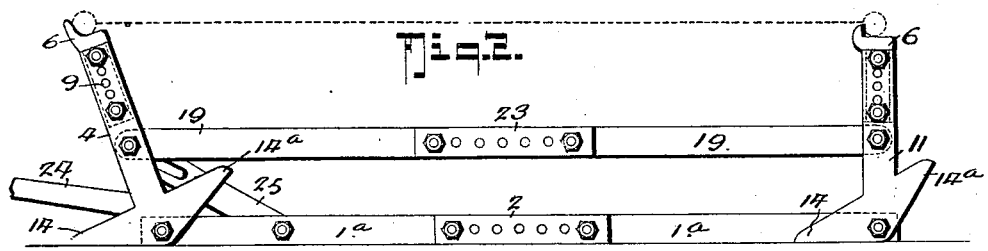
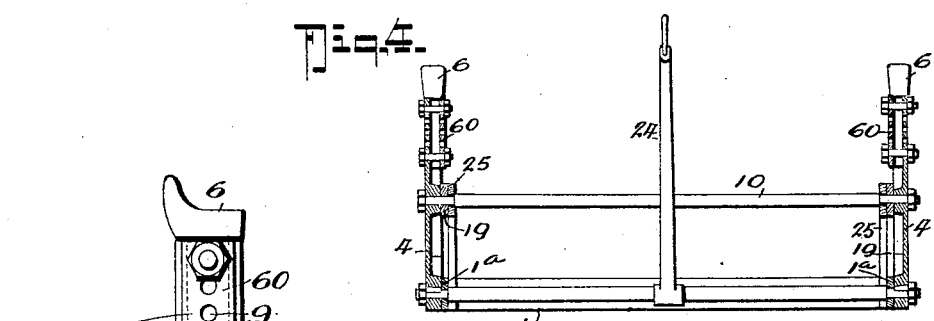
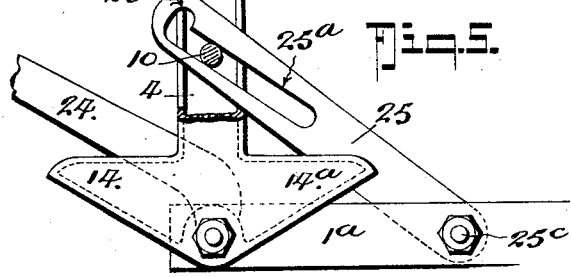
INVENTOR
Thomas J. Nash.
BY
Fred G. Dieterich & Co
ATTORNEYS

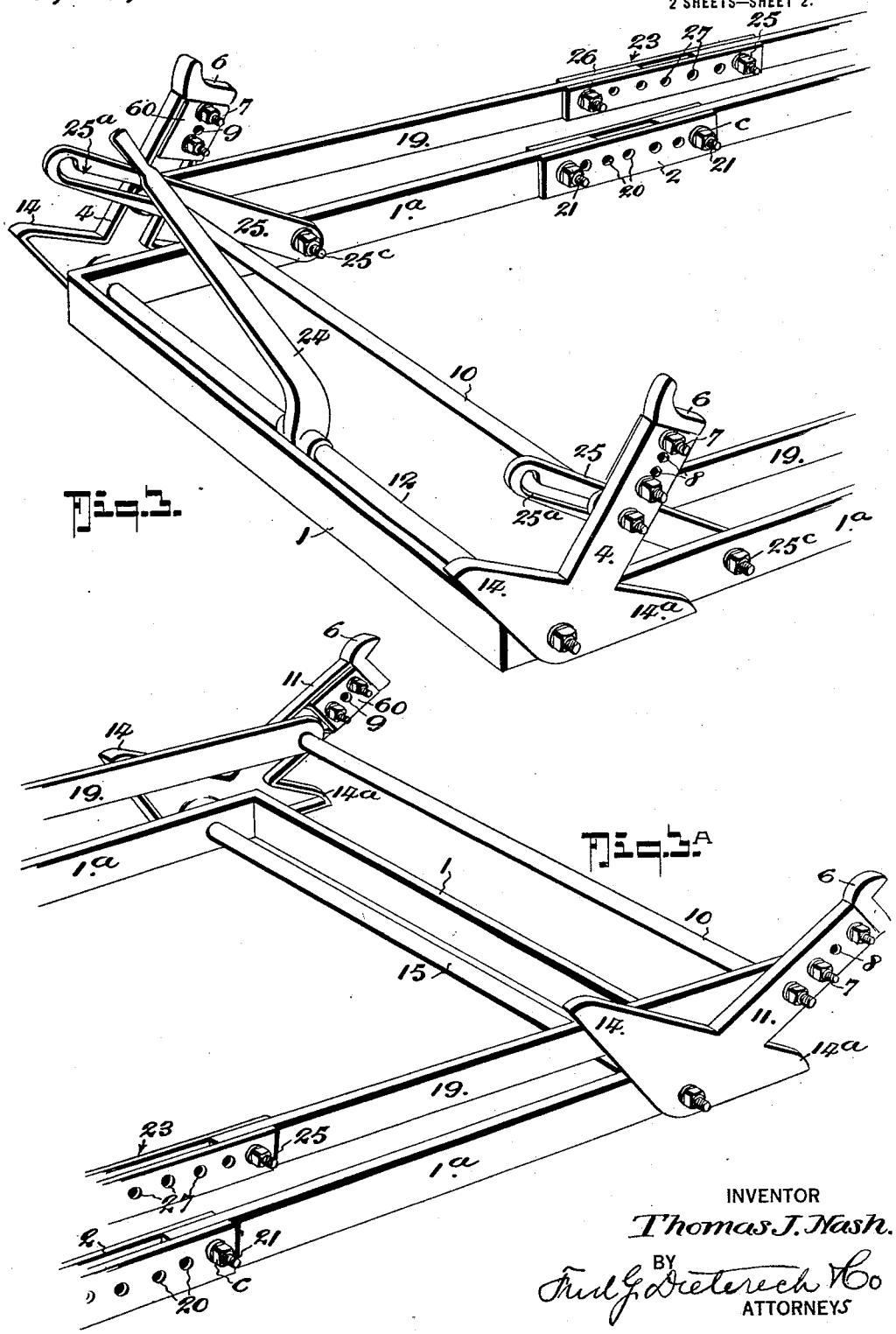

UNITED STATES PATENT OFFICE.

THOMAS J. NASH, OF LINCOLN, NEBRASKA, ASSIGNOR TO NATIONAL MANUFACTURING CO., INCORPORATED, OF LINCOLN, NEBRASKA.

AUTOMOBILE-JACK.

1,230,315.   Specification of Letters Patent.   Patented June 19, 1917.

Application filed October 28, 1916.   Serial No. 128,208.

*To all whom it may concern:*

Be it known that I, THOMAS J. NASH, residing at Lincoln, in the county of Lancaster and State of Nebraska, have invented a useful and Improved Automobile-Jack, of which the following is a specification.

My invention primarily has for its object to provide an improved jack mechanism for receiving an automobile and for sustaining it to free the wheels and in which the parts are particularly designed for preventing undue jarring and strain of the automobile parts during the operation of moving into engagement with the jack and while sustained at the elevated position by the jack.

Another object of my invention is to provide, in a jack mechanism of the general character mentioned, an improved arrangement of parts adapted for being shifted to effect the lifting action of the motor vehicle under the impelling or thrust movement of the vehicle and in which the supporting members are held to their vehicle sustaining position by the weight of the vehicle and combined with a simple hand lever releasing means whereby the vehicle can be quickly and gently lowered to rest on its wheels.

Again, my invention seeks to provide, in an automobile jack construction, a self-locking device for holding the front and back axle jack members locked to their lifted adjustment and a releasing means coöperatively combined therewith, whereby in the operation of lowering the machine, the rear wheels engage the floor in advance of the front wheels, thereby enabling the operator to effect the lowering of the machine with but a minimum strain in shifting the releasing lever.

With other objects in view that will hereinafter appear, my invention embodies the peculiar construction and novel arrangement of the parts to be described, specifically pointed out in the appended claims and illustrated in the accompanying drawings, in which:

Figure 1 is a side elevation of my improved jack, the parts being in the normal position to be engaged by the front axle of the automobile to be suspended thereby.

Fig. 2 is a similar view, the parts being shown positioned for sustaining the automobile.

Figs. 3 and 3ª are perspective views of the complete jack, the parts being at their normal position.

Fig. 4 is a transverse section thereof taken on the line 4—4 on Fig. 2.

Fig. 5 is a detail perspective view that illustrates one of the axle uprights and the coöperating locking lever, the locking bar and the reach bar end connected therewith.

The supporting means of my construction of automobile jack comprises two oppositely disposed end base members 1, the sides of which are bent at right angles to form opposite side members 1ª—1ª that extend toward each other and are joined, by adjustable link members 2, each provided with a series of longitudinally alined apertures 20—20 for receiving the tie bolts 21 that also pass through apertures in the side members 1ª—1ª and which receive nuts c, it being understood, from the drawing, that the adjusting link connection provides for the required shortening or lengthening adjustments for different lengths of wheel base.

4—4 designate a front pair of uprights, located one at each side of the base, to which the said uprights are connected by a cross bar 12 which passes through alining apertures in the base members 1ª—1ª and whose ends are squared for engaging the squared apertures in the lower end of the uprights, see Fig. 4, the said lower ends of the uprights terminating in a pair of oppositely directed feet 14—14ª, the relative position of which to the body of the uprights, being such, that when the said uprights 4 are swung down to their normal position, as shown in Fig. 1, the feet 14ª act as solid base abutments and, when the said uprights are swung to their uppermost or vehicle sustaining position, the feet 14 act as the solid base supports.

11—11 designate a pair of rear uprights and they are mounted at their lower ends on a cross rod 15 that passes through the lower ends of the said uprights and the adjacent ends of the base members 1ª—1ª and are connected to the said rod 15 to rock therewith.

The uprights 11 have foot members 14—14ª at their lower end that project from the standards in a manner substantially like the foot members 14—14ª on the front uprights 4, excepting that the said members are angled in such a manner, relatively to the uprights 11, that when the said uprights are swung down to the normal position, as shown in Fig. 1, the head or axle engaging portions 6—6, presently again referred to, are in a plane low enough to allow the front axle of the automobile to clear them as the machine advances, under its own power, into the jack engaging position.

Each of the uprights 4—4 and 11—11 includes a crotch or head portion 6 shaped for forming seats for respectively receiving the front and rear axles and the said crotch or head members 6 may be held at any required height by adjusting the bolts 7 in the desired ones of the alining apertures 8 in the uprights and the apertures 9 in the shank 60 of the crotch or head members.

Each upright is channeled at the upper end to slidably receive their respective crotch or head members 6.

19—19 designate a pair of reach bars, preferably in the nature of strap steel, and each of the said reach bars is formed of two sections joined by an adjusting strap plate 23 which has a series of longitudinally positioned apertures 27 into which the tie bolts 25$^c$ and 26 may be adjusted, as required.

The front end of the reach bars 19 are pivotally connected to a cross bolt 10 that joins the two uprights 4—4, and the rear ends of the said bars 19 are likewise pivotally connected to the rear uprights 11 by the cross bolt 16, as shown.

24 designates a hand lever fixedly attached to the cross bolt or rod 12 at the front end of the jack.

25—25 designate a pair of locking link bars pivotally connected to the side arms 1$^a$—1$^a$ of the base by a cross rod or bolt 25$^c$.

Each link bar 25 has a longitudinally elongated slot 25$^a$ formed at the upper end with a lateral notch 25$^b$ which receives the cross tie or bolt 10 that connects the front uprights 4 when the latter are swung up to their vertical axle sustaining position, as clearly shown in Fig. 2 of the drawing.

The manner in which my jack is operatively used, is best explained as follows:

The motor car on being driven onto the jack passes with its front axle over the rear jack uprights 11—11 and first engages the crotch or head ends of the front uprights 4—4 and, as the car moves forward, under its own power, the front wheels and axles are raised so that the said front wheels clear the floor, then as the front uprights pass slightly beyond their vertical position, the rear uprights will have been drawn sufficiently forward, by the reach members 19—19, to engage the rear axle; now as the front uprights have passed their vertical point and the heads 6 thereof are now passing downwardly and forwardly, the weight of the motor vehicle overbalances the uprights 4—4 and carries them farther in their forward swing and, in doing this, the rear uprights are swung up to the vertical position, shown in Fig. 2, which raises the rear wheels of the vehicle clear of the floor, it being understood, the said uprights are held to their raised position by the locking means 25—25 plus the weight of the machine, and so held until released by the hand lever 24 at the front end, it being clear from the drawing that in lifting the lever 24, the rear uprights 11 are at once moved back beyond their vertical position and the weight of the machine at that end now materially aids in bringing the front uprights back beyond their vertical points, thereby relieving the operator working the lever from undue strain in shifting the jack to lower the machine back to floor contact.

What I claim is:

1. In an apparatus of the character described, a base frame, cross rods in the base frame at each end, a pair of front uprights secured to the cross rod in the front end of the frame, one at each side of the frame, a second pair of uprights mounted on the cross rod at the rear of the frame, one at each side of the frame, longitudinal connecting rods connecting the front and back uprights, transverse connecting rods for the respective front and back pairs of uprights, a lever on the front cross rod that is mounted in the base frame for turning the same to move the uprights from one position to the other, said uprights having angled foot portions, the floor engaging faces of the front upright making approximately equal angles with the front uprights whereby the front upright may be extended to the front or the rear of a vertical position, the floor engaging faces of the foot portions of the rear uprights making respectively, right and acute angles with said rear uprights whereby the rear upright may assume a vertical position or a position to the rear of the vertical.

2. In an apparatus of the character described, a base frame, cross rods in the base frame at each end, a pair of front uprights secured to the cross rod in the front end of the frame, one at each side of the frame, a second pair of uprights mounted on the cross rod at the rear of the frame, one at each side of the frame, longitudinal connecting rods connecting the front and back uprights, transverse connecting rods for the respective front and back pairs of uprights, a lever on the front cross rod that is mounted in the base frame for turning the same to move the uprights from one position to the other, said uprights having angled foot portions, the floor engaging faces of the front upright making acute angles with the front uprights whereby the front upright may be extended to the front or the rear of a vertical position, the floor engaging faces of the foot portions of the rear uprights making, respectively, right and acute angles with said rear uprights whereby the rear uprights may assume a vertical position or a position to the rear of the vertical, and latch members pivoted to the frame and having slots provided with angled ends to receive the cross brace rod of the front pair of uprights and latch the front pair of uprights in the final position.

3. In an apparatus of the character described, a base frame, cross rods in the base frame at each end, a pair of front uprights secured to the cross rod in the front end of the frame, one at each side of the frame, a second pair of uprights mounted on the cross rod at the rear of the frame, one at each side of the frame, longitudinal connecting rods connecting the front and back uprights, transverse connecting rods for the respective front and back pairs of uprights, a lever on the front cross rod that is mounted in the base frame for turning the same to move the uprights from one position to the other, said uprights having angled foot portions, the floor engaging faces of the front upright making approximately equal angles with the front uprights whereby the front uprights may be extended to the front or the rear of a vertical position, the floor engaging faces of the foot portions of the rear uprights making, respectively, right and acute angles with said rear uprights whereby the rear uprights may assume a vertical position or a position to the rear of the vertical, said uprights consisting of channel members and axle engaging heads having shanks in said channel members and adjustably secured to the same.

THOMAS J. NASH.

Copies of this patent may be obtained for five cents each, by addressing the "Commissioner of Patents, Washington, D. C."